United States Patent [19]

Faust et al.

[11] Patent Number: 5,714,296
[45] Date of Patent: Feb. 3, 1998

[54] GRAFT COPOLYMERS AND COLORLESS, TRANSPARENT ELECTROPHOTOGRAPHIC TONERS THEREOF

[75] Inventors: Raimund Josef Faust; Danuta Eva Allen, both of Wiesbaden, Germany

[73] Assignee: Agfa-Gevaert AG, Leverkusen, Germany

[21] Appl. No.: 578,982

[22] Filed: Dec. 27, 1995

[30] Foreign Application Priority Data

Dec. 29, 1994 [DE] Germany ............... 44 47 107.6

[51] Int. Cl.⁶ .................... G03G 9/13; G03G 9/135
[52] U.S. Cl. ............... 430/114; 430/115; 430/904; 525/279; 525/286
[58] Field of Search ................. 430/114, 115, 430/904; 525/286, 279

[56] References Cited

U.S. PATENT DOCUMENTS

| | | |
|---|---|---|
| 3,880,656 | 4/1975 | Nagashima et al. . |
| 4,081,391 | 3/1978 | Tsubuko et al. ............ 430/114 |
| 4,148,968 | 4/1979 | Nagashima et al. ............ 428/454 |
| 4,374,918 | 2/1983 | Veillette et al. ............ 430/115 |
| 4,764,447 | 8/1988 | Tsubuko et al. ............ 430/115 |

FOREIGN PATENT DOCUMENTS

| | | |
|---|---|---|
| 0 066 955 | 12/1982 | European Pat. Off. . |
| 2 248 191 | 4/1973 | Germany . |
| 1-142688 | 6/1989 | Japan . |
| 2-140757 | 5/1990 | Japan . |

*Primary Examiner*—Janis L. Dote
*Attorney, Agent, or Firm*—Foley & Lardner

[57] ABSTRACT

A graft copolymer of recurring units of ($C_6$–$C_{18}$)alkyl (meth)acrylate (A), vinylpyridine (B), glycidyl (meth) acrylate (C), and glycidyl (meth) acrylate units esterified with (meth)acrylic acid (D) onto which polymeric side chains of units of vinylpyridine, ($C_1$–$C_3$)alkyl acrylate, and optionally ($C_1$–$C_3$)alkyl methacrylate are grafted. The polymer is suitable as a binder for colorless, positively chargeable liquid toners, in particular in combination with a copolymer of ($C_6$–$C_{18}$)alkyl (meth) acrylate and hydroxyalkyl (meth) acrylate as charge control agents. After fixing of the electrophotographically produced toner image, the toners give colorless resist masks or printing screens with a high resistance toward etching agents and solvents.

15 Claims, No Drawings

GRAFT COPOLYMERS AND COLORLESS, TRANSPARENT ELECTROPHOTOGRAPHIC TONERS THEREOF

BACKGROUND OF THE INVENTION

1. Field of the Invention

The invention relates to graft copolymers and positively controlled electrophotographic liquid toners which include these copolymers as binders.

2. Description of Related Art

Electrophotographic liquid toners are usually particles dispersed in a liquid of high electrical resistance. The main constituents of the particles are resinous polymeric binders, charge control substances, and colored pigments or dyestuffs. The dyestuffs or preferably colored pigments are generally necessary, since their purpose is visualization of latent images, for example, in customary electrophotographic copies. These dyestuffs or pigments often at the same time act as charge control substances, and for this reason are also necessary constituents of the toner.

No colored toners are necessary, however, for certain uses of electrophotographic imaging processes, for example, for the production of printing plates or resist masks. The toner image here is used merely for production of image elements which accept printing ink or for imagewise covering of a surface as a protection against etching solutions or electroplating baths. Such colorless or white toners are already known.

JP-A Hei 1/142 688 describes white or transparent toners which comprise a polymeric binder, a charge control substance, a release agent, and if appropriate a white pigment. Binders which are employed are, for example, polystyrene, styrene/butadiene or styrene/acrylic acid copolymers, polyethylene, ethylene copolymers, phenolic resins, epoxy resins, allylphthalate polymers, polyamides, polyesters, and maleate resins. Positive charge control substances which are mentioned are organic compounds containing basic nitrogen atoms or fillers treated on the surface with such compounds, and negative charge control substances which are mentioned are compounds containing carboxyl groups. The toner images obtained with these toners are not sufficiently resistant toward aggressive chemicals and are not free from defects (pin-holes) and are thus only poorly suitable for use as resist materials.

Colorless toners are also described in JP-A 2/140 757. They are employed there as additives to colored toners. They comprise relatively high contents of waxes and are therefore unsuitable for the production of toner images for planographic printing forms or resist materials.

EP-A 66 955 and DE-A 22 48 191 describe colorless toners which comprise a compound which is capable of reacting to give a colored compound. These toners also do not have adequate resistance toward aggressive substances, such as etching agents.

SUMMARY OF THE INVENTION

The object of the invention was to propose polymers which are suitable as binders for positively chargeable electrophotographic toners. It is also an object to provide polymers that can be processed in combination with suitable high molecular weight charge control substances in long-chain aliphatic hydrocarbons to give a stable toner dispersion from which, by an electrophotographic route, colorless transparent toner images can be deposited which can be fixed to a defect-free layer with good resistance toward aggressive chemicals and toward mechanical abrasion during planographic printing and which suffer no troublesome discoloration during fixing or burning in of the toner image.

In accordance with these objectives, there is provided according to the present invention, a graft copolymer of recurring units A, B, C, and D

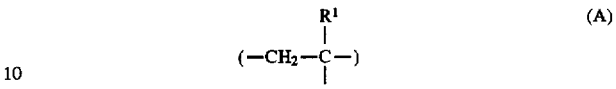

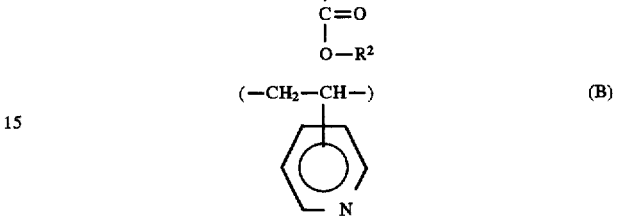

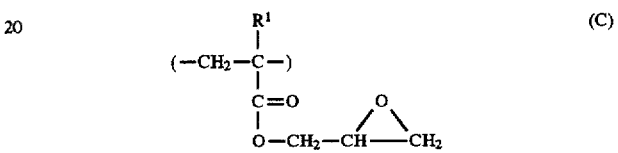

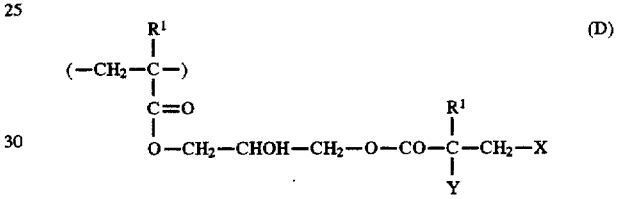

in which X and Y are initiator radicals or grafted-on polymeric radicals of units B, E, and F

in which $R^1$ is a hydrogen atom or a methyl group, $R^2$ is an alkyl group having 6 to 18 carbon atoms and $R^3$ is an alkyl group having 1 to 3 carbon atoms and not more than one of the radicals X and Y is an initiator radical. The type $R^1$, $R^2$, and/or $R^3$ radicals as well as the R radicals described below can vary in the various recurring units.

Upon initiation of the graft polymerization, a radical of the thermally activatable polymerization initiator is linked to one of the double bond carbon atoms of the (meth)acryloyl radical of the unit from which D is formed by graft polymerization. On such addition to the double bond, the other carbon atom is converted to a free radical capable of starting the polymerization of unsaturated compounds to form a chain of units B and E. The polymerization initiator may be e.g. a peroxy or azo compound.

In accordance with the above objective, there is also provided a colorless and transparent, positive-working liquid toner which comprises a stable dispersion of a high molecular weight polymeric binder and a high molecular weight polymeric control agent preferably in an aliphatic hydrocarbon, in which toner the binder is a graft copolymer of the abovementioned composition and the control agent is any desired agent, but preferably a polymer with units A and G, in which A has the above-mentioned meaning and G corresponds to the formula

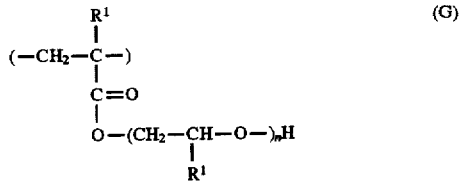

in which $R^1$ has the meaning given above, the two $R^1$ can be identical or different, and n is a number from 1 to 3.

In accordance with the present invention, there is also provided methods of using the liquid toner described above for the production of planographic printing plates or resist materials, such as etch or electroplating resists.

Further objects, features, and advantages of the present invention will become apparent from the detailed description of preferred embodiments that follows.

DETAILED DESCRIPTION OF THE PREFERRED EMBODIMENTS

In contrast to customary electrophotographic toners, the toners according to the present invention are colorless and transparent, and they therefore do not contain constituents which are suitable and active for subsequent processing as color-forming agents. Their purpose is therefore to produce colorless toner images which are suitable as image-wise coverings or masks on surfaces to be modified, for example, as etch reserves, or as color-carrying image elements of a printing plate, in particular a planographic printing plate.

In the known colored toners, the content of pigment or dyestuffs not only has the effect of imparting a desired coloration to the toner image; these constituents influence and also promote to a substantial extent the chargeability of the toner particles. If the colored pigments are omitted, the desired electrophotographic properties are therefore severely impaired.

As has now been found by the present inventors, an electrophotographic liquid toner having very good electrophotographic properties which can be processed to toner images having outstanding resistance toward solvents and chemicals, for example, toward damping waters comprising alcohols in planographic printing or toward etching agents, can be prepared by using the graft copolymers of the present invention as binders, preferably in combination with the abovementioned copolymers as charge control substances. The toners according to the invention furthermore have the property that they do not discolor in a troublesome manner during fixing by melting.

The graft copolymers according to the invention includes a number of different units. Their basic chain contains units A of alkyl (meth)acrylates having 6 to 18 carbon atoms in the alkyl group. These units promote the formation of stable dispersions. The basic chain furthermore contains units B, which are derived from vinylpyridine, in particular 4-vinylpyridine, and promote positive chargeability. It furthermore contains units C of (meth)acrylic acid esters having functional groups, via which linking with the grafted-on side chains takes place. These units are preferably glycidyl (meth)acrylate units. Usually, these units are also still contained in the finished graft polymer, since during the reaction with reactive compounds, in particular (meth)acrylic acid, onto which the grafted-on side chains later add, they are not completely reacted. Finally, the basic chain also contains those units which are formed from the glycidyl methacrylate units by reaction with functional compounds, in particular unsaturated carboxylic acids, and further polymerization thereof with unsaturated compounds to give polymeric side chains. The side chains in turn contain units of type B and units F of short-chain alkyl (meth)acrylates, at least some of the alkyl (meth)acrylate units consisting of alkyl acrylate units E.

The amount of units A, B, C and D in the basic chain is controlled to give the desired effects, and in general is in the range of 50–100, preferably 60–80 parts by weight of A, 0.5–3.0, preferably 1–2 parts by weight of B, 0.5–4, preferably 1.5–3 parts by weight of C and 250–1000, preferably 350–600 parts by weight of D. The molecular weight $M_w$ of the total graft copolymer generally is within the range from 1,000 to 1,000,000, preferably from 2,000 to 200,000.

The graft copolymers according to the invention are especially useful in liquid toner compositions. In such compositions, the graft copolymers are generally mixed with charge control substances or control agents. Any desired control agent or substance can be used. These agents are preferably copolymers of units A and G. The amounts of units A and G is varied as desired and preferably in the range from 67 to 98% in particular 80 to 94% by weight of A to 2 to 33% in particular 6 to 20% by weight of G, based on the total A and G.

The graft copolymers according to the invention may be prepared in any desired manner, generally by conventional solution or emulsion polymerization. The polymers are expediently prepared in several stages. Generally, a polymer is first prepared by solution or emulsion polymerization of monomers which form units A, B, and C. The polymerization is expediently carried out with free radical initiation in a solvent which is already suitable as a dispersing agent for later use of the toner. The amount of monomers in this stage is generally in the range of 50–100, preferably 60–80 parts by weight of A, 0.5–3, preferably 1–2 parts by weight of B and 1–6, preferably 2–4 parts by weight of C. This terpolymer is reacted with acrylic or methacrylic acid in the presence of, for example, a tertiary amine in a second stage, the glycidyl group of unit C reacting with the carboxyl group of the (meth)acrylic acid to form an ester D. The amounts in this state are chosen such that the carboxyl groups are reacted completely and only some of the epoxide groups are esterified. In general, about 0.1 to 0.9, preferably 0.2 to 0.75 equivalent of acid are employed per equivalent of epoxide groups.

Finally, further monomers of types B, E, and F are polymerized in the presence of the polymer with lateral (meth)acryloyloxy groups in a grafting polymerization reaction. A graft copolymer with grafted-on side chains of these units is formed by this reaction. The ratio of the amounts of units B, E, and F in the side chain is in general chosen such that on average about 1–20 units of B, 150–300 units of E and 70–150 units of F are present per unit of (meth)acrylic acid.

Generally, in addition to the grafted-on chains of B, E, and F, independent copolymers of B, E, and F which are not bonded to the basic polymer of A, B, C and D are also always formed to a certain extent. Their presence does not interfere with the usefulness of the polymerization product as long as graft polymers are formed to a significant extent. This is ensured if the preparation is carried out in the manner described, i.e., if polymers with lateral (meth)acryloyl groups are available as starting sites for a polymerization in the last stage of the polymerization.

To prepare the toner according to the invention, the finished graft copolymers are mixed with a desired polymeric charge control substances generally of the abovementioned composition. Mixing is carried out as desired, most expediently by mixing of the stable dispersions obtained in a hydrocarbon as the solvent or dispersing agent during the polymerization in the desired ratio of amount and if necessary by dilution with further solvents.

The preferred charge control agent is likewise prepared by polymerization from monomers which form units A and G. The polymerization is carried out as desired, advantageously carried out in solution or emulsion in an inert solvent, preferably an aliphatic or aromatic hydrocarbon. It is in general carried out in the same manner as for the preparation of the binder.

In the copolymers, unit A, $R^2$ is an alkyl radical having 6 to 18, preferably 8 to 15 carbon atoms; $R^3$ is preferably a methyl group. In units G, $R^1$ is preferably a hydrogen atom and n is preferably 1. The polymer of the charge control agent in general contains units A in an amount of 67–98% preferably 80–94% by weight and units G in an amount of 2–33, preferably 6–20% by weight.

As mentioned above, the liquid toner according to the invention is prepared by mixing binders and control agents, advantageously in the form of the stable dispersions in hydrocarbons obtained during the polymerization. Any desired dispersing agents can be used. Dispersing agents which are preferably employed are aliphatic hydrocarbons having about 8 to 15 carbon atoms. The amounts of binder and control substance are in general in the range of 80–99% preferably 85–96% by weight of binder and 1–20% preferably 4–15% by weight of control agent, based on the total solids content. The ready-to-use toners in general have a solids content of about 0.5–10% preferably 0.8–5% by weight.

The toners according to the invention are distinguished by the fact that they have a positive chargeability at the required level without addition of colored pigments or dyestuffs. They also require no low molecular weight charge control agents and, after fixing to give the toner image, they therefore have a particularly good resistance toward etching agents and organic solvents, which renders them outstandingly suitable for use as resist masks and for planographic printing plates. Because of their colorlessness and transparency, which are also retained after fixing, they are also suitable for the production of colored images by imagewise covering of a colored layer and removal of the exposed areas of the layer by washing out or etching. These advantages are achieved by combination of the specific polymeric binders and charge control agents described above.

The following examples explain preferred embodiments of the invention. The examples are for illustrative purposes only and do not limit the scope of the invention.

EXAMPLE 1

Synthesis of a Graft Polymer as a Binder

Reaction Stage 1

72 g of 2-ethylhexyl methacrylate, 1.2 g of 4-vinylpyridine, 2.7 g of glycidyl methacrylate, 1.0 g of azoisobutyronitrile and 125 g of Isopar H (mixture of branched $C_{10}$- to $C_{12}$-paraffin hydrocarbons, boiling range 179°–192° C.; flashpoint 58° C.) were initially introduced into a three-necked flask with a reflux condenser, gas inlet tube and stirrer and were polymerized under extra pure nitrogen; for this, the mixture was heated to 90° C. with a heating bath and polymerized at 90° C. for 6 hours, while stirring. After cooling, the mixture was aerated, 100 ml of Isopar H were added and some (100 ml) of the solvent was then distilled off in vacuo under 20 mbar in order to remove residual monomers. The polymer solution thus obtained was colorless and transparent in appearance and slightly viscous.

Reaction Stage 2

The intermediate product obtained from reaction stage 1 was reacted with methacrylic acid in a three-necked flask with a reflux condenser, gas inlet tube and stirrer. For this, 200 g of the intermediate product were first initially introduced into the flask and heated to 90° C., and 0.16 g of dimethylaminododecane and, after 30 minutes, 0.42 g of methacrylic acid were added. After a total reaction time of 14 hours at 90° C., a colorless, transparent reaction product was obtained.

Viscosity: 89 to 105 mPa.s

Solids: 40% by weight

Reaction Stage 3

29.0 g of the product from reaction stage 2, 54 g of methyl acrylate, 27 g of methyl methacrylate, 3.0 g of 4-vinylpyridine, 0.4 g of tert-dodecylmercaptan and 0.9 g of azoisobutyronitrile were initially introduced into a three-necked flask with a reflux condenser, gas inlet tube and stirrer under extra pure nitrogen and were heated to an internal temperature of 90° C. Polymerization was carried out at 90° C. for 7 hours; a further 0.8 g of azoisobutyronitrile was then added and polymerization was carried out again at 90° C. for 5 hours. After cooling, the mixture was aerated, 100 ml of Isopar H were added and some of the solvent (100 ml) was removed by distillation in vacuo in order to remove residual monomers. A milky-white reaction product was obtained.

(Solution A)

Viscosity: 3.2 to 3.6 mPa.s at 30% by weight of solids

Conductivity: 7 to $10 \cdot 10^{-12}$ Siemens/cm

Synthesis of a Polymeric Control Agent 35 g of lauryl methacrylate, 4.5 g of 2-hydroxyethyl methacrylate, 0.09 g of tert-dodecylmercaptan and 0.11 g of azoisobutyronitrile, dissolved in 120 g of toluene, were initially introduced into a three-necked flask with a reflux condenser, dropping funnel with a gas inlet tube and stirrer under extra pure nitrogen and were first heated to 70° C. After 1 hour, the mixture was heated to 80° C. and after a further 2 hours, the temperature was increased to 90° C.

107 g of lauryl methacrylate, 13.7 g of 2-hydroxyethyl methacrylate, 0.26 g of tert-dodecylmercaptan and 0.33 g of azoisobutyronitrile, dissolved in 120 g of toluene, were now added in the course of 2 hours and, when the addition had ended, polymerization was carried out at 90° C. for a further 4 hours. The mixture was then cooled and aerated. The toluene was distilled off in vacuo at 20 mbar. 240 ml of Isopar G [paraffin hydrocarbon mixture (boiling range 158°–176° C.; flashpoint 41° C.)] were then added.

Solids content: 40% by weight (Solution B)

Preparation of a Colorless Liquid Toner

Preparation of the Liquid Concentrate

The toner concentrate was prepared by mixing 66.9 g of solution A, 3.25 g of solution B and 235 g of Isopar G.

For this, solution A and solution B were first stirred at 60° C. for 1 hour and, after cooling, Isopar G was added and the mixture was stirred again for 5 minutes.

Preparation of the Toner by Dilution 4 parts by volume of Isopar G were added to 1 part by volume of liquid concentrate and the mixture was stirred at room temperature for 5 minutes.

Conductivity: $77.5 \cdot 10^{-12}$ Siemens/cm

Deposition on the cathode (at 1000 V; 1 s):

270 mg/100 ml of liquid toner.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A colorless and transparent positively chargeable liquid toner, comprising a stable dispersion of a graft copolymer comprising recurring units A, B, C, and D in the main chain

  (A)

  (B)

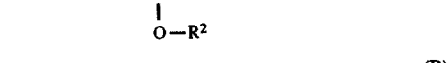  (C)

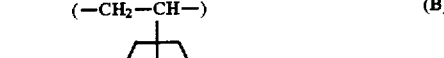

  (D)

wherein X and Y are an initiator radical or a grafted-on polymeric radical including units B, E, and F

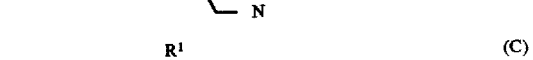  (E)

  (F)

wherein $R^1$ is a hydrogen atom or a methyl group, $R^2$ is an alkyl group having 6 to 18 carbon atoms and $R_3$ is an alkyl group having 1 to 3 carbon atoms, and not more than one of the radicals X and Y is an initiator radical, in a liquid dispersant.

2. A liquid toner as claimed in claim 1, wherein the parts by weight of units in the main chain of the graft copolymer is 50–100 parts A, 0.5–3 parts B, 0.5–4 parts C, and 250–1000 parts D.

3. A liquid toner as claimed in claim 1, wherein the parts by weight of units in the main chain of the graft copolymer is 60–80 parts A, 1–2 parts B, 1.5–3 parts C, and 350–600 parts D.

4. A liquid toner as claimed in claim 1, wherein the graft copolymer is prepared by polymerizing monomers which form units A, B, and C to form a terpolymer, reacting the terpolymer with acrylic or methacrylic acid to form units D, and polymerizing monomers to give the grafted on B, E, and F units.

5. A liquid toner as claimed in claim 1, wherein 1 to 20 units of B, 150–300 units of E, and 70–150 units of F are present in the graft position of the graft copolymer per unit of D.

6. A liquid toner as claimed in claim 1, further comprising a charge control agent.

7. A liquid toner as claimed in claim 6, containing 80–99% by weight of the graft copolymer and 1–20% by weight of control agent based on the total solids content of the toner.

8. A liquid toner as claimed in claim 6, which has a solids content of 0.5–10% by weight based on the total weight of the toner.

9. A liquid toner as claimed in claim 1, wherein the stable dispersion further comprises a polymeric control agent, wherein the control agent comprises a polymer with units A and G, wherein G corresponds to the formula

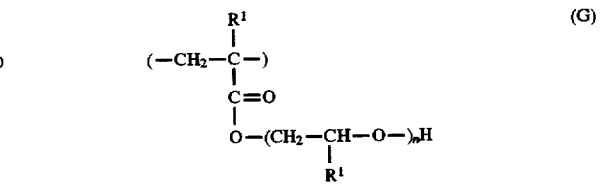  (G)

in which $R^1$ has the meaning given in claim 1, the two $R^1$'s can be identical or different, and n is a number from 1 to 3.

10. A liquid toner as claimed in claim 9, wherein the control agent comprises based on the total weight of the control agent 67 to 98% by weight of A, and 2 to 33% by weight of G.

11. A liquid toner as claimed in claim 9, wherein the liquid dispersant comprises a liquid hydrocarbon.

12. A liquid toner as claimed in claim 1, wherein the liquid dispersant comprises an aliphatic hydrocarbon having 8 to 15 carbon atoms.

13. A liquid toner as claimed in claim 1, wherein the liquid dispersant is an aliphatic hydrocarbon.

14. A liquid toner as claimed in claim 1, wherein the graft copolymer has a weight average molecular weight of 1,000 to 1,000,000.

15. A liquid toner as claimed in claim 1, which comprises a polymeric charge control substance.

* * * * *